United States Patent [19]

Matsumoto et al.

[11] Patent Number: 4,673,970

[45] Date of Patent: Jun. 16, 1987

[54] CHROMINANCE SIGNAL PROCESSING SYSTEM

[75] Inventors: Tokikazu Matsumoto, Osaka; Yukio Nakagawa, Moriguchi; Shinich Uchiyama, Katano, all of Japan

[73] Assignee: Matsushita Electric Industrial Co., Ltd., Osaka, Japan

[21] Appl. No.: 741,889

[22] Filed: Jun. 6, 1985

[30] Foreign Application Priority Data

Jun. 8, 1984 [JP] Japan ................................ 59-118513
Jun. 29, 1984 [JP] Japan ................................ 59-135633

[51] Int. Cl.⁴ ......................... H04N 9/71; H04N 9/68
[52] U.S. Cl. ........................................ 358/27; 358/316
[58] Field of Search ............................ 358/27, 40, 316

[56] References Cited

U.S. PATENT DOCUMENTS

| | | | |
|---|---|---|---|
| 4,306,247 | 12/1981 | Tomimoto et al. | 358/27 |
| 4,466,015 | 8/1984 | Wargo et al. | 358/27 |
| 4,482,916 | 11/1984 | Acampora | 358/27 |
| 4,539,583 | 9/1985 | Flamm et al. | 358/27 |
| 4,573,069 | 2/1986 | Lewis, Jr. | 358/27 |

*Primary Examiner*—James J. Groody
*Assistant Examiner*—Robert Michael Bauer

*Attorney, Agent, or Firm*—Wenderoth, Lind & Ponack

[57] ABSTRACT

A chrominance signal processing system includes a variable gain amplifier capable of effecting gain control for amplifying a carrier chrominance signal and an A/D converter for effecting an analog/digital conversion of an output of the variable gain amplifier. A demodulator demodulates an output of the A/D converter into two chrominance signals on two demodulation axes which are apart by 90° from each other. One of the chrominance difference signals is disposed at a right angle with respect to a vector of a burst signal of the carrier chrominance signal and the number of bits of the two chrominance difference signals are chosen such that the number of bits of the one chrominance difference signal disposed at right angles with respect to the burst signal vector is smaller than the number of bits of the other of the two chrominance difference signals. A computing circuit computes an amplitude of the burst signal from the two chrominance difference signals and a gain control circuit produces a circuit for controlling the gain of the variable gain amplifier from the output of the computing circuit. The two chrominance difference signals may be the R-Y and B-Y signal components of a carrier chrominance signal.

2 Claims, 11 Drawing Figures

CHROMINANCE SIGNAL PROCESSING SYSTEM

BACKGROUND OF THE INVENTION

1. Field of the Invention

The present invention relates to a chrominance signal processing system such as an automatic chrominance control circuit (hereinafter to be referred to as an ACC circuit) for effecting control to make the burst level constant, which is usable for a video tape recorder and the like.

2. Description of the Prior Art

In the video tape recorders for civilian use, there is employed a method of recording and reproducing the video signal by dividing it into a brightness signal and a chrominance signal, and, as to the chrominance signal, an ACC circuit is used so as to eliminate fluctuations of the chrominance signal level. Besides, in recent years, study has been made to process these signals digitally, and, in order to keep constant the level of the chrominance signal inputted into the A/D converter in effecting an A/D conversion of the chrominance signal, the importance of the ACC circuit has increased.

With reference to the drawings, a description of the conventional ACC circuit follows. FIG. 1 is a block diagram of the conventional ACC circuit. In the figure, the carrier chrominance signal inputted from an input terminal 1 is amplified by a variable gain amplifier 2 and outputted to an output terminal 3 and also sent to a synchronous detection circuit 4. The synchronous detection circuit 4 synchronously detects the carrier chrominance signal by the use of a carrier generated by an automatic phase control circuit (hereinafter to be referred to as an APC circuit) which generates a carrier synchronized in phase with the burst signal of the carrier chrominance signal and sends it to a burst gate 5. The burst gate 5 holds the level of the input signal during the burst period until the next burst period.

From the thus obtained burst signal level of the carrier chrominance signal, a reference level inputted from an input terminal 9 is subtracted with by a subtractor 6, and the variable gain amplifier 2 is controlled through a low-pass filter 7, by which control is effected so as to make the burst signal level of the carrier chrominance signal obtained in the output terminal 3 equal to the aforementioned reference level.

However, in the constitution as above, when the carrier chrominance signal appears after once dropping out (for example, when a change has been made from a monochromatic signal to a chromatic signal or when a slow motion reproduction or a high speed reproduction is made on a video tape recorder), it requires time for the APC circuit 8 to reproduce a carrier synchronized with the burst signal, during which interval the synchronous detection circuit 2 operates erroneously, so that the ACC circuit does not operate.

SUMMARY OF THE INVENTION

An object of the present invention is to provide a chrominance signal processing system such as an ACC circuit which is free from the erroneous operation even when the APC circuit operates erroneously and a carrier synchronized in phase with the burst signal cannot be obtained.

Another object of the present invention is to minimize the circuit scale by reducing the number of bits of one color difference signal in the step wherein the carrier chrominance signal, after being subjected to an A/D (analog/digital) conversion, is demodulated into two color difference signals and the amplitude of the burst signal is obtained from the two color difference signals.

A further object of the present invention is to provide a chrominance signal processing system which makes it possible to produce in an easy constitution a circuit wherein, in subjecting the carrier chrominance signal to a digital signal processing by an A/D conversion, the effective dynamic range of the input of the A/D converter can be most suitably used in the standard mode reproduction and the long-time mode reproduction, S/N deterioration is prevented, and fluctuations of the input carrier chrominance signal level of the A/D converter due to variations in temperature or components is small.

The chrominance signal processing system of the present invention comprises: a variable gain amplifier capable of effecting a gain control for amplifying a carrier chrominance signal; and A/D converter for effecting an analog/digital conversion of the output of said variable gain amplifier; a demodulator for demodulating the output of said A/D converter into two chrominance difference signals; a computing circuit for computing the amplitude of the burst signal of said carrier chrominance signal from said two chrominance signals; and a control circuit for producing a signal for controlling the gain of said variable gain amplifier by the output of said computing circuit, whereby the gain control is prevented from erroneous operation even when the demodulating axis of the demodulator is not in agreement with the burst phase.

As will be clear from the above explanation, the present invention is so constructed that the carrier chrominance signal, after being subjected to an A/D conversion, is demodulated into two color difference signals, and the amplitude of the burst signal is converted from the two color difference signals to perform the operation of the ACC circuit, such that, even in case of the erroneous operation of the APC circuit the ACC circuit does not perform erroneously. Also, since it computes a digital representation of the amplitude using the computing circuit, the computing circuit can be made into a simple constitution if, for example, a continuous special memory is used. Moreover, since the computing circuit gives a reference level digitally, the system can have an effect of suppressing the fluctuations of the input carrier chrominance signal to the A/D converter due to temperature variations or device variations to a low level.

Furthermore, the present invention has an excellent effect in that, by reducing only the number of bits of the R-Y signal, the circuit scale can be reduced without increasing the effect of the quantizing error on the ACC circuit.

Furthermore, the present invention has an effect of preventing deterioration of the S/N ratio of the chrominance signal because, by changing the level of the chrominance signal inputted to the A/D converter between the standard mode and the long-time mode, it is possible to utilize the effective dynamic range of the input of A/D converter to the maximum degree.

DESCRIPTION OF THE PREFERRED EMBODIMENTS

Preferred embodiments of the present invention will be described with reference to the drawings hereunder.

Figure 1:
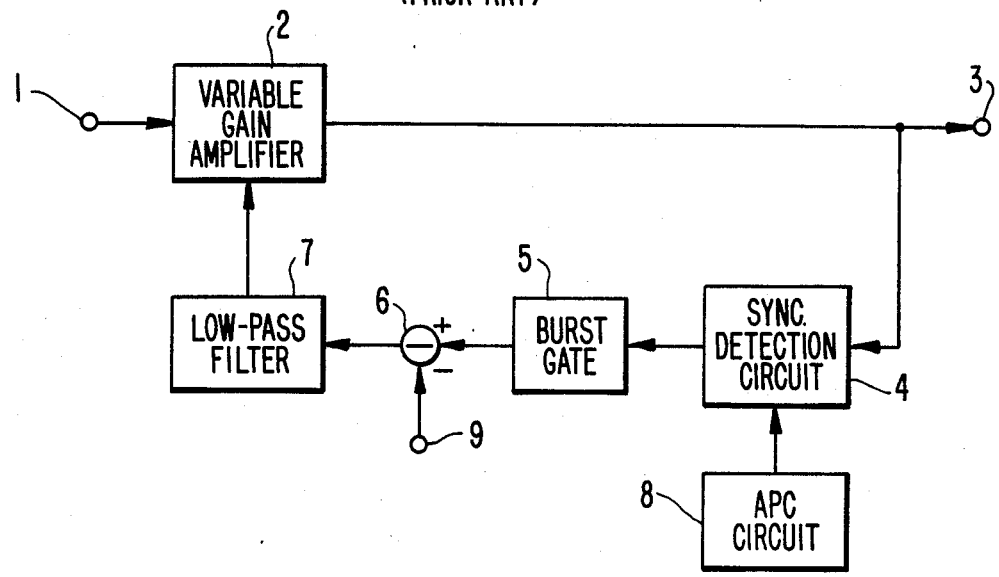
FIG. 1 is a block diagram showing the conventional ACC circuit constitution.
Figure 2:
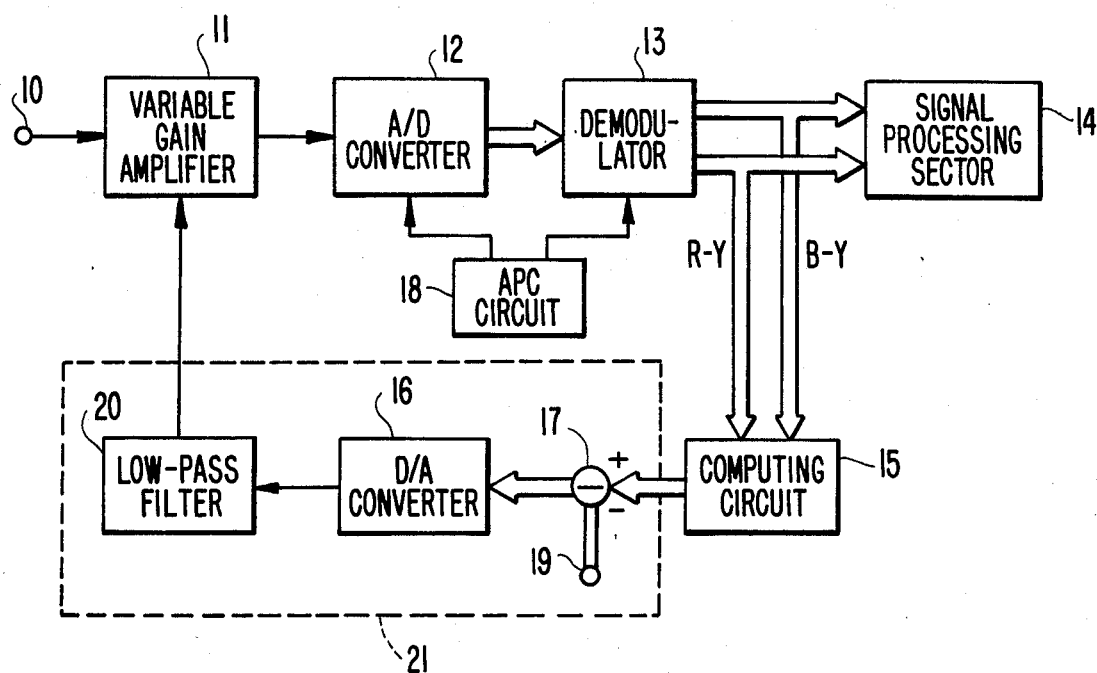
FIG. 2 is a block diagram showing a preferred embodiment of the present invention.

FIG. 2 is a block diagram of an ACC circuit in one example of the present invention. In the drawing, a carrier chrominance signal inputted from an input terminal 10 is amplified by a variable gain amplifier 11, and then converted into a digital signal by an A/D converter 12, and thereafter demodulated by a demodulator 13, for example, into a R-Y signal and a B-Y signal. At this time, the clock necessary for the A/D conversion and the carrier synchronized in phase with the burst signal necessary for the demodulation are produced in an APC circuit 18 and supplied to the A/D converter 12 and the demodulator 13, respectively. The R-Y signal and the B-Y signal are sent to a signal processing unit 14 which processes the chrominance signal needed in the video tape recorder, and also to a computing circuit 15. In the computing circuit 15, the burst period is so controlled that the R-Y signal and B-Y signal are respectively squared and added together, and the square root thereof is obtained and held until the next burst period. The operations to square and to obtain square root may be readily realized for example by a table written in a read only memory.

Figure 3A:
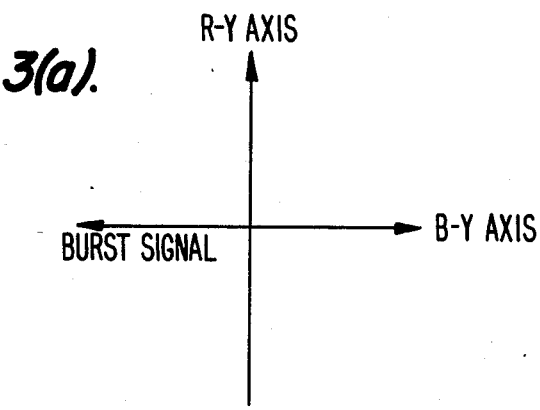
FIGS. 3 (a) and (b) are vector charts showing the vector relationship between the demodulation axis and the burst signal.
Figure 3B:
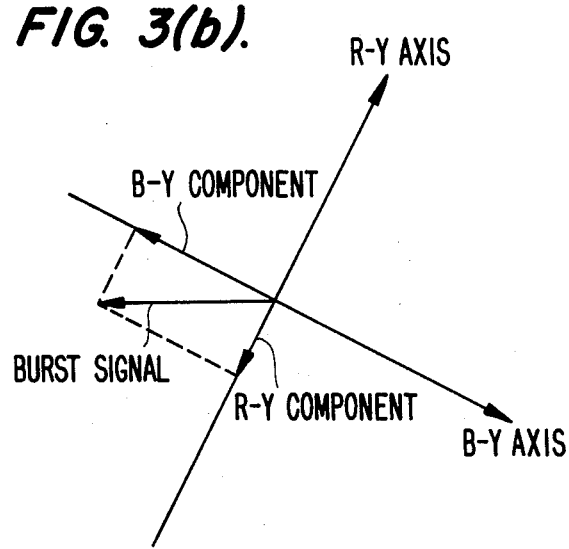
Figure 5A:
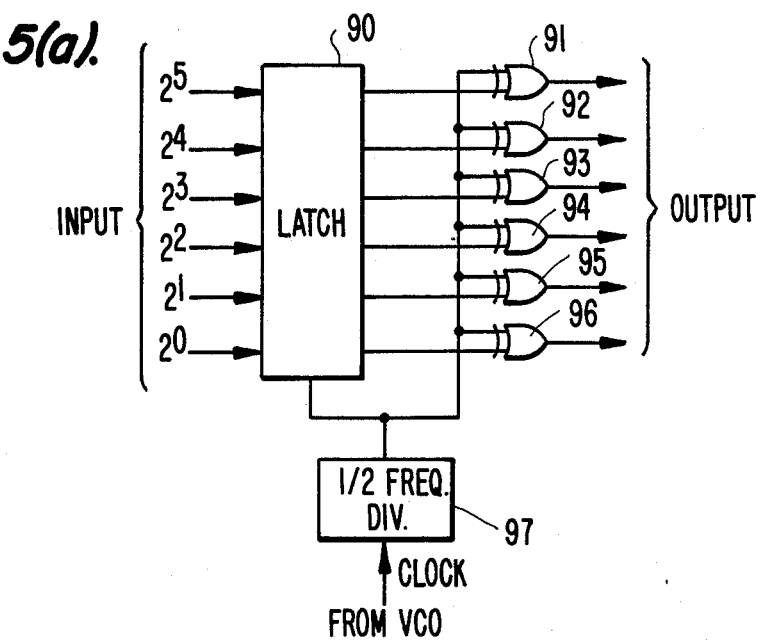
FIGS. 5 (a) to (d) are a block diagram and operating waveform diagrams showing an embodiment of the demodulator used in the embodiments of FIG. 2 and FIG. 4.

By such an operation, even if the phase of the carrier generated in the APC circuit 18 is not synchronous with the burst phase, the burst signal level is obtained in at the output of the computing circuit 15. The principle of this fact will be explained with reference to FIGS. 3 (a)-(b). FIG. 3 (a) is a vector chart representing the relationship between the R-Y axis, B-Y axis, and the burst signal at the time when a carrier, synchronized in phase with the burst signal, is fed to the demodulator 13, and FIG. 3 (b) is a vector chart when the APC circuit 18 is erroneously working, i.e., when the phase of the carrier fed to the demodulator 13 deviates from the phase of the burst signal.

As will be seen from FIG. 3 (a), when the APC circuit is normally working, the burst signal component appears on the B-Y axis only. Also, as will be seen from FIG. 3 (b), when the APC circuit is erroneously working, the burst signal component appears on the R-Y axis and the B-Y axis. However, as will be noted from the both charts, in either case, the burst signal level is given by the vector synthesis of the R-Y component and the B-Y component, so that, by the operation in the computing circuit as described above, even when a deviation of demodulation axes occur by due to the erroneous operation of the APC circuit, a burst signal level can be obtained.

The burst signal level as obtained in the above manner is inputted to a control circuit 21 constituted by a subtractor 17, a D/A (digital/analog) converter 16, and a low-pass filter 20 of FIG. 2 to control the variable gain amplifier 11. The operation of the control circuit 21 proceeds in the following manner. The burst signal level subjected to a D/A conversion by the D/A converter 16 is reduced in the subtractor 17 by the reference level fed from the input terminal 19, and passes through the low-pass filter 20 to control the variable gain amplifier 11. As a result, the input burst signal level of the A/D converter 12 becomes equal to the reference level fed from the input terminal 19.

Now, in the present embodiment, considering the minimization of the effect of the quantizing error which occurs from the fact that the burst signal is being processed as a digital signal, the number of bits for the burst signal processing is desirably larger.

On the other hand, as seen from FIGS. 3 (a)-(b), when the APC circuit is normally operating, the burst signal can be obtained by the component of the B-Y axis only, and the component of the R-Y axis is unnecessary. When the APC circuit is in an erroneous operation, the R-Y axis component is also necessary as previously explained, but, since the erroneous operation of the APC circuit occurs in a transitional condition in which a color signal is suddenly inputted, the frequency of error occurrence is small. Accordingly, by decreasing only the number of bits of the R-Y signal, the circuit scale can be reduced without increasing the effect of the quantizing error during the normal operation of the APC circuit, and furthermore, even at the time of the erroneous operation of the APC, the erroneous operation of the ACC circuit can be prevented.

In the above explanation, the color difference signals, the R-Y signal and B-Y signal were taken as examples. However, in the case of the component parallel (in phase) with the component crossing at right angles (quadrature) with the burst signal, the number of bits of the component crossing at right angles with the burst signal can be reduced in a similar manner.

Next, another embodiment of the present invention will be illustrated with reference to the drawings.

Figure 4:
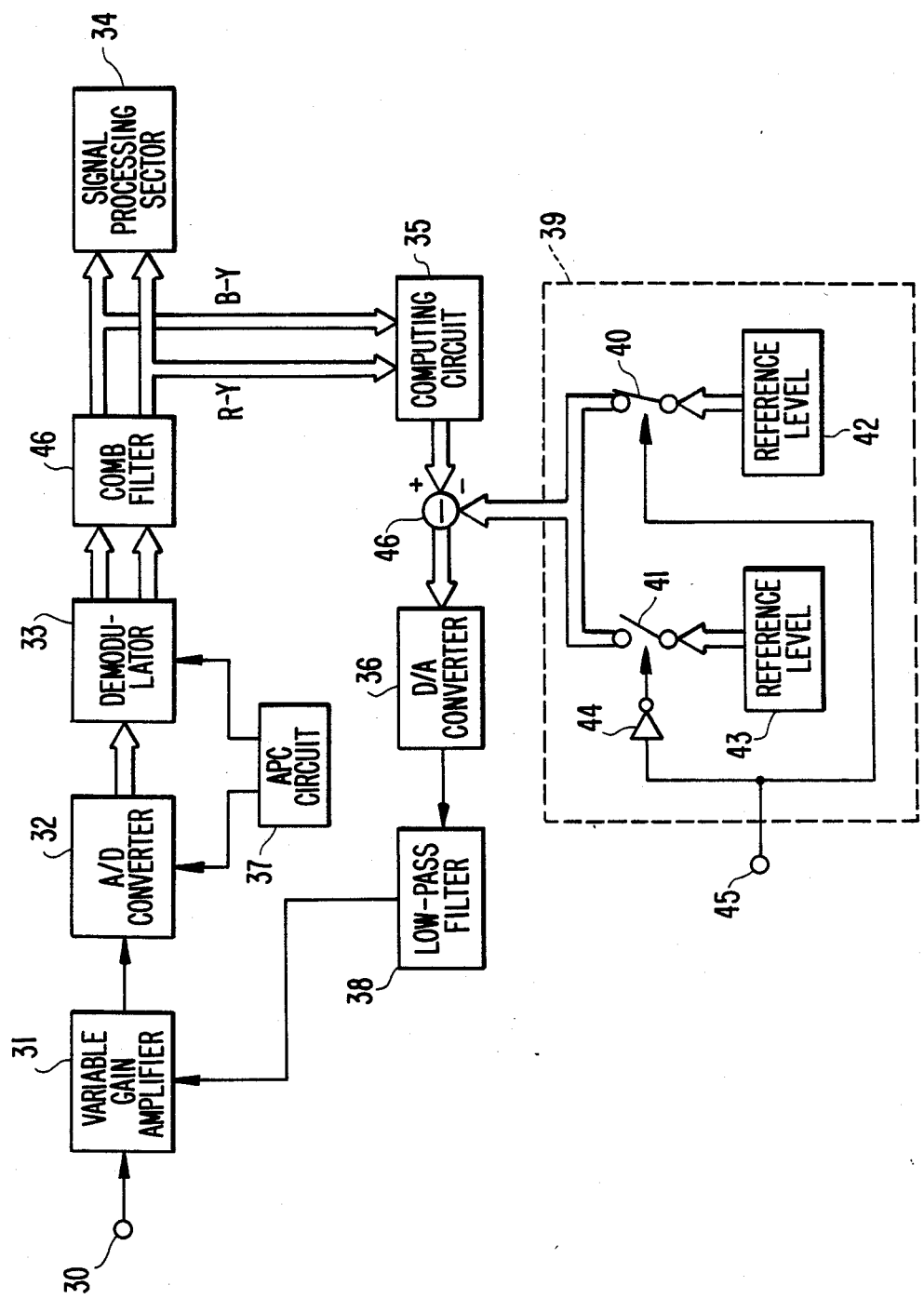
FIG. 4 is a block diagram showing another embodiment of the present invention.
Figure 5B:
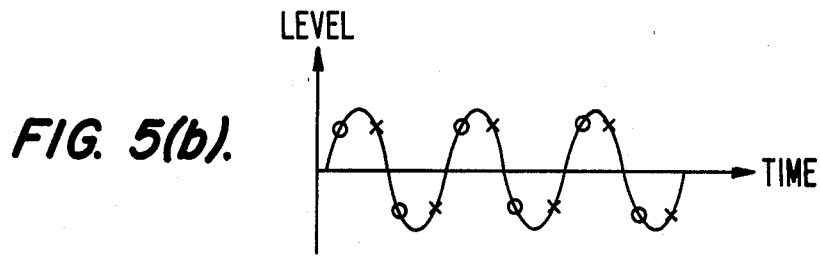
Figure 5C:
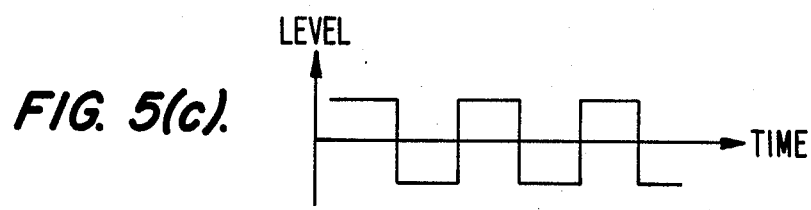
Figure 5D:
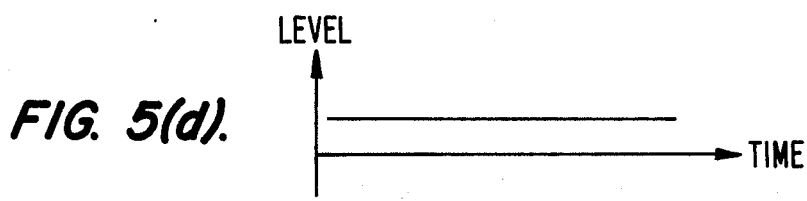

FIG. 4 is a block diagram of a chrominance signal processing system according to another embodiment of the present invention. A low-frequency converted carrier chrominance signal inputted from a terminal 30 is subjected to level adjustment by a control signal in a gain control amplifier 31 and converted to a digital signal by an A/D converter 32, and thereafter is demodulated into two color difference signals, B-Y and R-Y by a demodulator 33. The clock and carrier for the A/D converter 32 and the demodulator 33 are respectively supplied from an APC circuit 37. Then, the demodulated B-Y signal and R-Y signal undergo removal by a comb filter 46 of the crosstalk component from the adjacent track included in the reproduced signal of the video tape recorder in the long-play mode, and sent to a signal processing unit 34, and also to a computing circuit 35. The computing circuit 35 detects the level of the burst signal in the same manner as in the first embodiment, and its output is subjected to a reduction by a reference level generated from a reference level generator 39, and then converted into an analog signal by a D/A converter 36, and controls the variable gain amplifier 31 through a low-pass filter 38. As a result, the input of the A/D converter 32 is so controlled that the level of the burst signal after removal of the crosstalk becomes equal to the reference level generated from the reference level generator 39. Accordingly, in the case of the long-play mode, because the input of the A/D converter 32 becomes larger by the crosstalk portion than the standard mode, the reference level requires to be changed over. In this embodiment, the reference level generator 39 has two reference levels 42 and 43 inside, and is designed to control the standard level proportional to the control signal to be inputted to a terminal 45 by the use of an inverter 44 and switches 40 and 41.

According to the present embodiment constituted as above, the input level of the A/D converter 32 can be selected in proportion to the control signal inputted to the terminal 45, so that, at the time of the long-play mode having a crosstalk component from the adjacent track, setting can be made by changing over to the level that the input of the A/D converter 32 does not exceed the dynamic range of the A/D converter 32 by the cross-talk component. For this reason, at the time of the standard mode reproduction and the long-play mode reproduction, the effective dynamic range of the input of A/D converter 32 is utilized to the maximum extent to prevent deterioration of the S/N ratio attributed to the quantizing noise. In the foregoing explanation, description was made only for the case of reproduction, but the system is usable at the time of recording as well.

Next, regarding the substantial constitutions of the demodulator 33, comb filter 46, and computing circuit 35 in the present embodiment, an explanation will be made with reference to FIGS. 5(a)-(d), FIG. 6, and FIG. 7, respectively. FIG. 5 (a) shows an embodiment of the demodulator. In this embodiment, an explanation will be made for the case where the number of quantizing bits is 6 bits and the sampling frequency is four times that of the chrominance signal. FIG. 5 (b) shows the state where the carrier chrominance signal has been sampled, wherein the marks O and X represent the sampling points. When the thus sampled signals are latched every other sample with a latch 90, a signal as shown in FIG. 5 (c) is obtained. This is the case where sampling has been made on the parts marked with O. The latch pulses are obtained by dividing the clock generated from the VCO in half by a ½ frequency divider 97. By reversing the output of the latch 90 every other clock with EX-OR circuits 91-96, there is obtained a demodulation output as shown in FIG. 5 (d). Assuming the demodulation output in this case to be, for example, the B-Y signal, the R-Y signal in which the demodulation axis is advanced by 90° relative to the B-Y signal can be obtained by latching and reversing in the same circuit as in FIG. 5 (a) the sampling points shown in the mark X in FIG. 5 (b). In this embodiment, since the sampling frequency is selected to be four times that of the carrier frequency, the distance between the sampling points corresponds to 90°.

Figure 6:
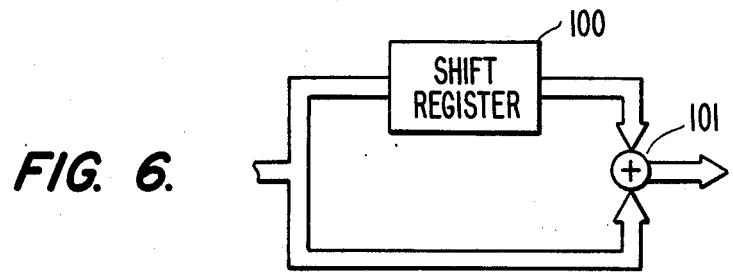
FIG. 6 is a block diagram showing an embodiment of a comb filter used in the embodiment of FIG. 4.

In FIG. 6, a substantial constitution of the comb filter 46 is shown. The comb filter can be realized by adding the present signal to the signal which is one line before the present signal. In this embodiment, the signal delayed by one line is obtained by use of a shift register 100 as a one line delay circuit, and, by adding said signal to the present signal with an adder 101. Two filters are used for the R-Y signal and the B-Y signal. For the one line delay circuit a memory may also be used.

Figure 7:
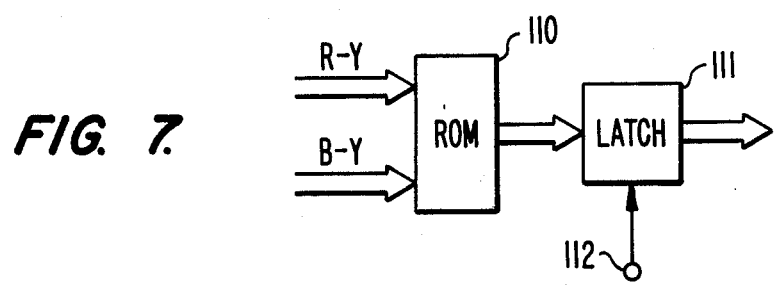
FIG. 7 is a block diagram showing an embodiment of the computing circuit used in the embodiments of FIG. 2 and FIG. 4.

FIG. 7 shows an example of the computing circuit. As previously explained, in a ROM (read only memory) 110 is written a table for squaring the R-Y signal and the B-Y signal respectively, adding them together, and taking the square root thereof. Assuming the R-Y signal and the B-Y signal to be, for example, 6 bits respectively, the data having an address of 12 bits may be used for the ROM 110. The computed output is obtained from the data output of ROM 110. This output is held in a latch circuit 111 by the latch pulse inputted from an input terminal 112 for one horizontal synchronous period.

It is to be understood that the constitution of the demodulator, comb filter, and computing circuit are not limited to those as explained above, but they may of course be modified into various other constitutions known in the art.

What is claimed is:

1. A chrominance signal processing system comprising:
    a variable gain amplifier capable of effecting gain control for amplifying a carrier chrominance signal;
    an A/D converter for effecting an analog/digital conversion of an output of said variable gain amplifier;
    a demodulator for demodulating an output of said A/D converter into two chrominance difference signals on two demodulation axes which are apart by 90 degrees from each other, one of said two chrominance difference signals being disposed at a right angle with respect to a vector of a burst signal of said carrier chrominance signal, wherein the number of bits of the two chrominance difference signals are so constituted that the number of bits of said one chrominance difference signal disposed at right angles with respect to the burst signal vector is smaller than the number of bits of the other of said two chrominance difference signals;
    a computing circuit for computing an amplitude of the burst signal from said two chrominance difference signals; and a control circuit for producing a signal for controlling the gain of said variable gain amplifier from the output of said computing circuit.

2. A system according to claim 1, wherein said two chrominance difference signals are R-Y and B-Y signals.

* * * * *